Nov. 1, 1932.                L. KOEPPE                1,885,208
                          PROJECTION SCREEN
                         Filed Aug. 29, 1930

Inventor:
Leonhard Koeppe
by Karl...
Atty.

Patented Nov. 1, 1932

1,885,208

UNITED STATES PATENT OFFICE

LEONHARD KOEPPE, OF HALLE-ON-THE-SAALE, GERMANY

PROJECTION SCREEN

Application filed August 29, 1930, Serial No. 478,689, and in Germany July 30, 1929.

My invention relates to projection screens and more especially to screens of the type which renders the images projected thereon visible by reflexion. Screens of this kind have been made of glass, metal, plastic masses such as gelatine, celluloid, cellulose acetate etc. and further of fabric coated with metal bronze. The screens to which this invention refers, while being spoken of in this specification as metallic screens, include screens made of any of the materials above enumerated.

Metallic projection screens (including those made of aluminium bronze), such are now in use, have the defect that the total angle of dispersion within which they reflect into the auditorium the light of the stationary or kinematographically moved pictures is relatively small; in consequence of this the intensity of the light of the projected pictures being viewed appears weaker and weaker to those members of the audience who are seated at the sides, as the distance from the centre line of the auditorium increases. Furthermore, the known projection screens cause an objectionable distortion of the pictures to those members of the audience who are seated far out at the sides of the auditorium owing to the excessive shortening of the horizontal transverse dimensions of the pictures.

The projection screen according to the present invention avoids these defects and has the following important advantages:

A beam of light horizontally projected on to a metal reflector is reflected therefrom over an angle of more than 160°, so that even those members of the audience who are seated far out at the sides of the auditorium observe in these pictures exactly the same intensity of light as those who sit nearer the middle. Furthermore, the distortion of the transverse dimensions of the picture, which increases when the picture is viewed more and more from the sides, is reduced to a minimum which is no longer worrying.

The screen according to the invention is composed on the surface facing the projection apparatus, of a system of segments of cylinders which touch and are vertical and parallel to each other and are coated with aluminium bronze or some similar reflecting metallic coating. According to the invention the segments of cylinders are so elliptically convex in horizontal section and are so disposed that the major axes lie horizontally. The surface gloss of the aluminium bronze or the reflecting metallic coating is advantageously so selected that the gloss corresponds to that of a good quality silk.

The elliptic segmental surface configuration of the reticulated screen is best obtained by so pressing suitably bronzed and flexible material, in the longitudinal direction of the segments between suitably shaped rollers, so that the direction of the rolling corresponds to the longitudinal direction of the segments. The screen may be made of any pliable woven material which can be rolled up like a carpet and therefore easily carried around.

In the drawing affixed to this specification and forming part thereof a screen embodying my invention is illustrated diagrammatically by way of example.

In the drawing

Fig. 1 is a greatly enlarged horizontal section of the screen, while

Figure 1:
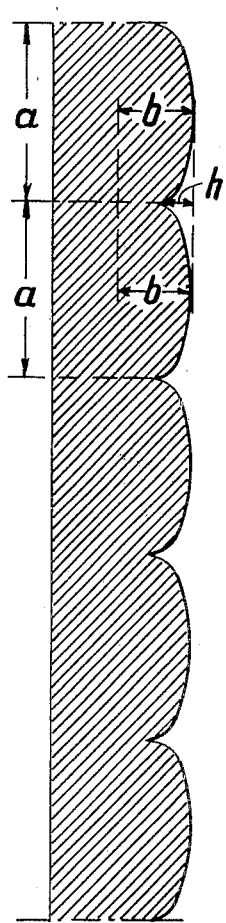

The surface of the screen, which is shown in section in Fig. 1 may be advantageously prepared in three different ways, according to the minimum distance of the screen from the audience, depending on the manner of suspension of the screen.

The elliptic segmental surface configuration of the reticulated screen has, in relation to the light falling thereon or to the stationary or moving pictures projected thereon, the following optical effect.

Figure 2:
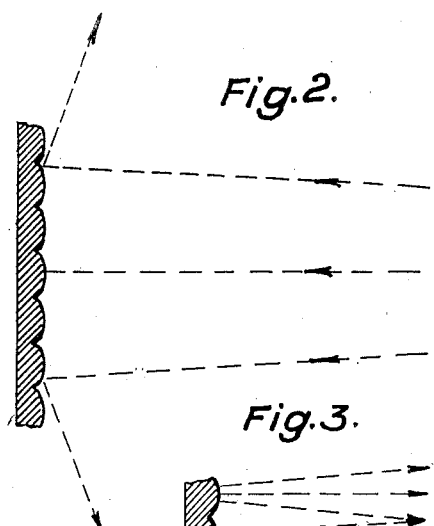
Figs. 2 and 4 are similar views, drawn to a smaller scale, illustrating the reflexion effects obtained with it.

Even for those members of the audience seated well over the sides of the auditorium there is a sufficiently strong reflection of light from the surface of the screen, which, as shown in Fig. 2 (enlarged to about 22.5:1), is produced at the correspondingly situated lateral portions of the vertically disposed elliptic convex segments of cylinders which form the reticulated surface of the screen and therefore supplies for those members of the audience who sit at the sides of the auditorium approximately the same intensity of light of the stationary or moved projected pictures as pass by reason of the high coefficient of reflection of the metallic surface bronzing of the reticulated screen to those members of the audience who are seated in the middle of the auditorium.

Experiments have shown that the angle of dispersion of the reticulated screen which yields in the horizontal plane a high light intensity of the projected pictures amounts to over 160°, which should be amply sufficient for the widest auditorium.

The uniform brightness of the projected pictures observed with the elliotic segmental surface of the screen cannot be obtained for central and lateral directions if in the horizontal section of the screen suitably dimensioned, arcs be selected instead of the flat ellipses, that is to say, if the surface of the screen be made the segment of a circle.

Figure 3:
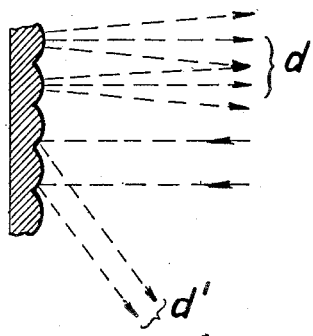
Fig. 3 shows how the light would be reflected, if the screen had a circular segmental configuration.

Fig. 3 shows that a screen surface having such a circular segmental configuration must effect, for those members of the audience who are seated near the sides, an apparent increase in the brightness of the picture compared with that observed nearer the middle. This is explained by the fact that the pencils of light rays reflected from the small convex circular segments more or less perpendicularly towards the front and close together and corresponding to each other from segment to segment, must, owing to the central curvature which is greater with these circles than with flat ellipses, diverge more rapidly than in the case of reflection from the correspondingly situated more central parts of the ellipse. The reason is that at this point these pencils of light remain closer together owing to the comparatively smaller curvature and diverge more slowly.

Figure 4:
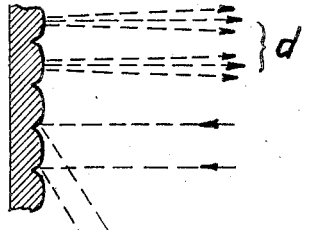

As Fig. 3 (circles) and Fig. 4 (ellipses) show, this property is particularly useful in the approximately parallel pencils of light rays which are reflected more strongly laterally and which belong to each pair of contiguous segments. For, as is clear from the drawing, the distance apart $d'$ of these pencils of light rays must, as the lateral reflection increases, be always smaller owing to shortening in perspective, than the distance $d$ at more or less central reflection. For this shortening in perspective of $d'$ as the lateral angle of view increases, that is to say as the angle of incidence of the projected rays of light increases, the following values are obtained:

At an angle of incidence of 30° $d'=0.87\ d$
At an angle of incidence of 45° $d'=0.71\ d$
At an angle of incidence of 60° $d'=0.5\ d$
At an angle of incidence of 80° $d'=0.2\ d$ As Figs. 3 and 4 show, the difference between $d$ and $d'$ becomes considerably more disturbing in the case of the circular segments than in the case of the elliptical segments. With the latter case, the distance $d$ between the pencils of light, may be considered as the distance which corresponds to the lateral rays which come immediately next to two adjacent centre rays and are slightly convergent. The value for $d$ becomes correspondingly smaller and approaches the value $d'$ corresponding to the lateral reflection, whereby a brightness of the picture uniformly distributed over the whole surface of the screen is ensured for the various angles of view.

It will be clear that the shortening in perspective of $d'$ decreases rapidly as the angle of incidence increases and consequently causes a correspondingly increasing crowding of the adjacent and approximately parallel reflected pencils of light rays. This crowding however, causes the lateral increasing brightness referred to above of the projected picture when the surface of the screen is composed of segments of circles. On the other hand, the error with the elliptic segmental screen surface almost completely vanishes.

The central decrease in brightness of the picture which exists with a circular segmental screen surface, would also show itself unduly if the cylindrical segments were of a steep elliptical, that is to say parabolic, form. The reasons for this would have to be sought in the fact that in this segmental form the central curvature proceeds more rapidly than in the flat elliptical curve.

In addition to the equalization of $d$ and $d'$ approximately assured by the elliptical form of the reflecting elements of the screen surface even when the pictures are viewed from the sides, the additional fact, evident from Figs. 2 and 4, namely, that the audience looks from every point of the auditorium vertically on to the several elements of the picture and reflecting surfaces of the segments of the screen, brings another very important advantage with it. As experiments have shown the phenomenon of excessive fore-shortening of horizontally projected parts of the field of the picture as the view from the side increases and which is exceedingly objectionable in the projection screens hitherto used, is very much less evident which is also an advantage when considering the complete picture.

Finally, with regard to the necessary dispersion of the high lights of the screen, a total dispersion of about 30° to 40° up and down measured in the vertical plane, is sufficient for most cinemas. In consideration of the fact that the slight "matting" selected for the screen surface corresponds to that of the gloss on silk, a slightly diffused dispersion is arranged for, owing to this toning down of the high metallic gloss which dispersion acts in the form of the sufficiently great high light dispersion before referred to. The optical dispersing action of the slight matting of the metallic surface of the screen is assisted by the very many fine structural and superficial regularities of the screen so that owing to the reflection which is then active and more or less irregular, the desired dispersing effect is intensified.

In conjunction with the great total dispersion the high light dispersion therefore fills all parts of the auditorium so that the projected picture can be seen with the same degree of brightness by everybody in the house.

In addition to the lateral light dispersion, which is wide and practically of the same intensity all over, and which is free from transverse fore-shortening, the elliptic segmental surface formation of the screen produces a maximum intensification of the natural stereoscopic nature of the light pictures projected on to the screen and based, in stationary pictures, on correct photographic perspective, in moving pictures partly on this and partly on the mutual continuously changing parallax of the different portions of the picture.

As experiments have shown, the screen functions within the total range of dispersion in such a way that for distances from the screen which are greater than those to be selected for the above-mentioned types of screen, the fine elliptic segmental surface striation of the screen is no longer disturbingly visible as the magnitude of the angle of vision at which the arc of each ellipse appears in the horizontal plane is then less than half an arc minute, while both the stationary and also the kinematographically moved projected picture in particular appears with more and more intense stereoscopic nature than when the projection screens hitherto employed are used. It is immaterial here whether these latter have a smooth, a corrugated, a fluted or a coarsely grained surface. The stronger stereoscopic nature is particularly noticeable in landscape and telephotography as these, as experience has demonstrated, exhibit only a comparatively slight stereoscopic nature or practically none in the methods of projection heretofore employed.

At the same time a picture scene is produced which develops apparently slightly in front of and slightly behind the plane of the reticulation and the audience "focussed" and already stimulated by the correct photographic perspective and also by the parallax (which in moving pictures is continuously changing) of the different parts of the picture with respect to the three dimensional correct stereoscopic effects (this phenomenon is known as the so-called "railway effect") localizes the various parts of the picture appearing partly in front of and partly behind the plane of the reticulation, from any part of the auditorium in planes which are mutually correctly positioned.

This partly intentional, partly spontaneous fusion effect intensifies the stereoscopic effect to the audience already conceived mentally by reason of the perspective and also by the constantly changing parallax of the moving picture to such a degree that a total effect of the pictures projected on to the screen is produced which may be termed as being in relief.

That this relief-like picture effect also contributes to the benefit of the members of the audience who are seated at the sides and also those who sit upstairs and downstairs, does not require any further corroboration; likewise the important fact that for the use of the reticulated projection screen herein described any desired film running at the cinemas can be used at once and will give the three new picture effects hereinbefore described.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. A projection screen having a surface comprising contiguously arranged vertical cylindrical segments arranged in parallel to each other, each segment having a convex elliptical horizontal cross section having its major axis arranged horizontally.

2. A projection screen having a surface comprising contiguously arranged vertical cylindrical segments arranged in parallel to each other, coated with a reflecting metallic coating, each segment having a convex elliptical horizontal cross section having its major axis arranged horizontally.

3. A projection screen consisting of plastic flexible material and having a surface comprising contiguously arranged vertical cylindrical segments arranged in parallel to each other, each segment having a convex elliptical horizontal cross section having its major axis arranged horizontally.

In testimony whereof I affix my signature.

LEONHARD KOEPPE.